June 12, 1923.

H. B. BURLEY ET AL.

INSULATED ELECTRIC WIRE

Filed Feb. 6, 1922

1,458,803

Inventors
Harry B. Burley
Henry E. Rooney
by I. Paris. Attorney

Patented June 12, 1923.

1,458,803

UNITED STATES PATENT OFFICE.

HARRY B. BURLEY AND HENRY E. ROONEY, OF BROOKLINE, MASSACHUSETTS, ASSIGNORS TO BOSTON INSULATED WIRE AND CABLE COMPANY, A CORPORATION OF MASSACHUSETTS.

INSULATED ELECTRIC WIRE.

Application filed February 6, 1922. Serial No. 534,469.

*To all whom it may concern:*

Be it known that we, HARRY B. BURLEY and HENRY E. ROONEY, citizens of the United States, and residents of Brookline, in the county of Norfolk, in the State of Massachusetts, and of Boston, in the county of Suffolk, in the said State, respectively, have invented a new and useful Insulated Electric Wire, of which the following is a specification.

Our present invention relates to electric wires or cables of the class in which rubber or rubber compound is used for insulating purposes. Our invention relates more specifically to wires or cables covered by a vulcanized rubber compound designed for use in the transmission of high voltages.

The common method of insulating such wires is to increase the thickness of the rubber wall when it is desired to transmit a higher voltage. It is found, however, that by this method a point is reached beyond which the increase in the thickness of the wall does not give any commensurate advantages in the voltage carrying capacity of the wire or cable.

It is the object of this invention to increase the dielectric strength of the insulation of the rubber covered wire or cable, to increase their voltage carrying capacity, and to render such wires or cables capable of withstanding a higher voltage without increasing the thickness of the insulating wall of wire or cable.

We accomplish these objects by embedding within the rubber compound insulation one or more interlayers of cotton, flax, hemp or similar fibrous material of a flexible character. An interlayer of such material has a conductivity substantially greater than that of rubber. This interlayer, therefore, acts to distribute over the inner surface of the rubber, surrounding said interlayer material, any leakage of the current through an interior portion of the insulation.

In our wire or cable we apply a layer of rubber compound, an interlayer of fibrous material, and another layer of rubber compound in succession. When desired another layer of fibrous material and another layer of rubber compound is applied. The cable is then placed in a mold described in a copending application and is subjected to the process described in said application.

Our interlayer of fibrous material may be applied in the form of a braiding, a spiral wrapping or in any other form desired. In order to accomplish our object, we prefer to make this interlayer continuous over the entire surface of the rubber it encloses. We apply it in such a manner as to constitute a uniform, thin and continuous closely wrapped, braided or wound sheath over the inner layer of rubber.

A clear understanding of the structure of our wire or cable may be had by referring to the drawing forming a part of this specification.

Figure 1:
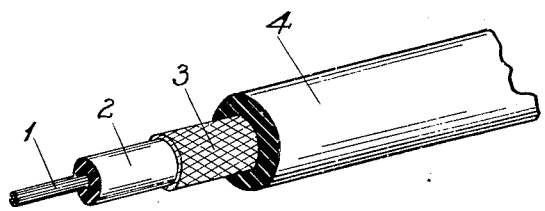
Fig. 1 shows a wire constructed in accordance with our invention.
Figure 2:
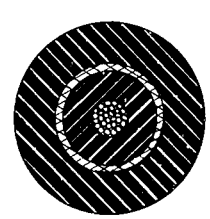
Fig. 2 shows a transverse section of this wire.

Referring to the drawings, 1 indicates the metallic electrical conductor. This may be of the solid conductor type or of the stranded conductor type. Enclosing this conductor is a duplex body of rubber compound insulation, which in accordance with our invention, consists of a primary layer 2 and a secondary layer 4 of solid rubber compound. Between the layers 2 and 4 is provided an interlayer 3 consisting of a winding or braiding of cotton, hemp or the like. Such an interlayer has an electrical conductivity of a degree greater than that of the rubber compound. The primary layer 2 is solid and of moderate thickness. The intermediate layer is preferably braided and wound tightly on the primary layer so as to bind it. This braided fabric is of such a nature as to constitute a thin continuous sheath over the primary layer of rubber.

Figure 3:
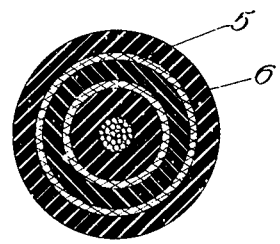
Fig. 3 shows a modification of our invention.

Fig. 3 shows a modification which is provided with a second intermediate layer 5 and an additional layer of rubber compound 6.

We have found that with a wire or cable of definite dimensions, one interlayer of fibrous material increases the voltage carrying capacity of the wire or cable 25% to 30%. Two interlayers of fibrous material as shown in Fig. 3 increases the voltage carrying capacity of the wire about 50%.

The only theory available to us which explains the increase in the dielectric strength of the resulting insulating covering is based on the fact that the interlayer material has a substantially greater conductivity than that of the rubber compound. The interlayer serves to distribute the electrostatic stresses, that may arise along any line radiating from the conductor, over the entire inner surface of the outer layer of rubber or over a sufficient portion of it to reduce the likelihood of the insulation breaking down along that line.

We claim:

1. A high voltage rubber insulated electric wire comprising a conductor, a plurality of layers of rubber insulation enclosing said conductor, and a continuous interlayer of fibrous material of a conductivity substantially greater than the conductivity of the rubber separating the successive layers of insulation.

2. A high voltage rubber insulated electric wire comprising a conductor, a plurality of layers of rubber compound enclosing said conductor, and a continuous interlayer of an insulating material of a conductivity substantially greater than the conductivity of the rubber separating the successive layers of rubber, whereby the voltage carrying capacity of the wire is increased.

3. An insulated electric wire or cable comprising a conductor, a plurality of layers of rubber insulation enclosing said conductor and an interlayer of fabric of a conductivity substantially greater than the conductivity of rubber, said interlayer constituting a continuous sheath enclosing the inner layer of rubber.

In testimony whereof we hereunto affix our signatures.

HARRY B. BURLEY.
HENRY E. ROONEY.